Oct. 13, 1931.　　　　V. S. MACKRES　　　　1,826,942
APPARATUS FOR CLEANING GLASSWARE
Filed Sept. 20, 1927　　3 Sheets-Sheet 1
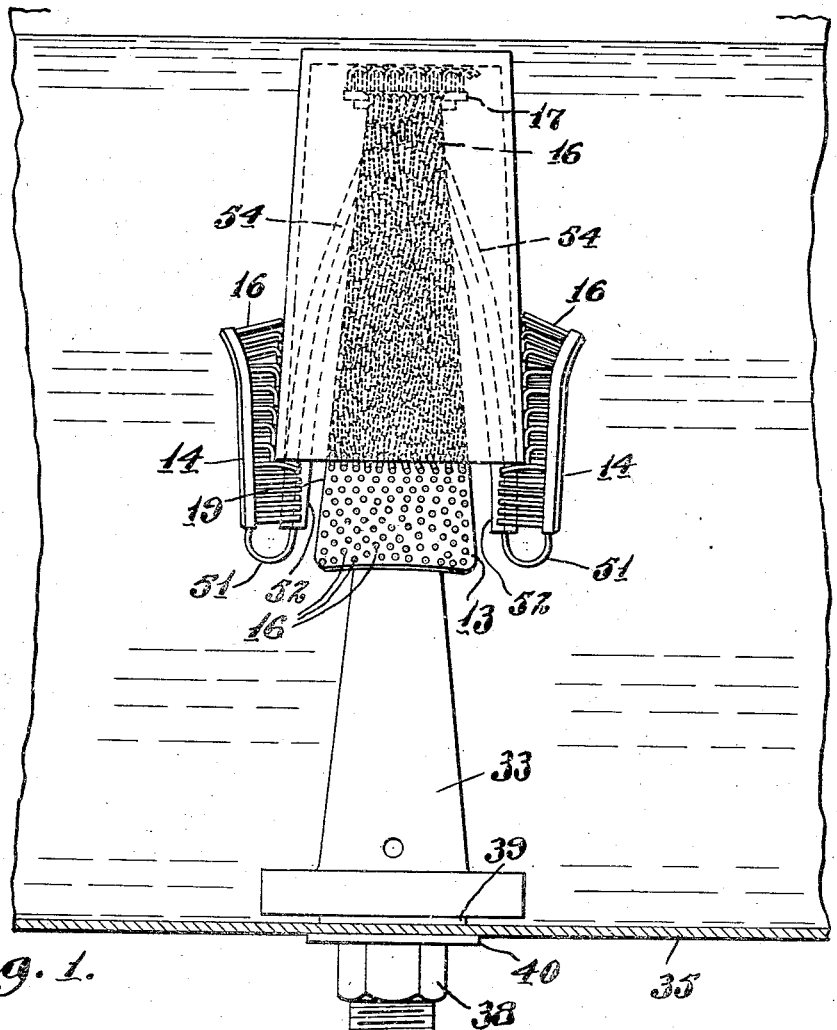
Fig. 1.
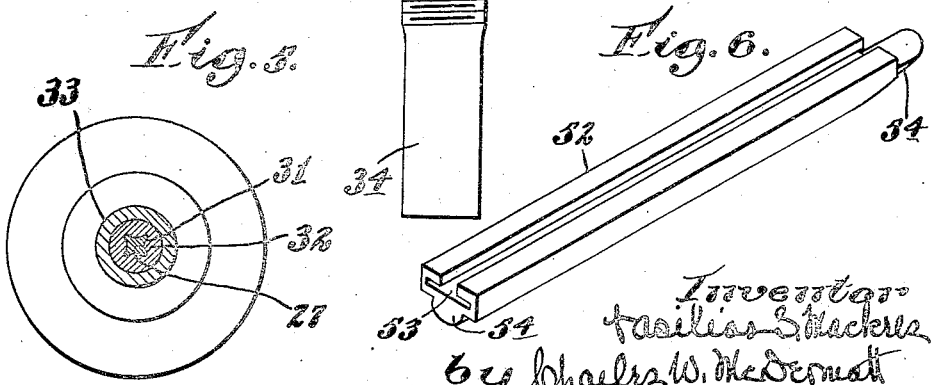

Oct. 13, 1931.   V. S. MACKRES   1,826,942
APPARATUS FOR CLEANING GLASSWARE
Filed Sept. 20, 1927   3 Sheets-Sheet 2
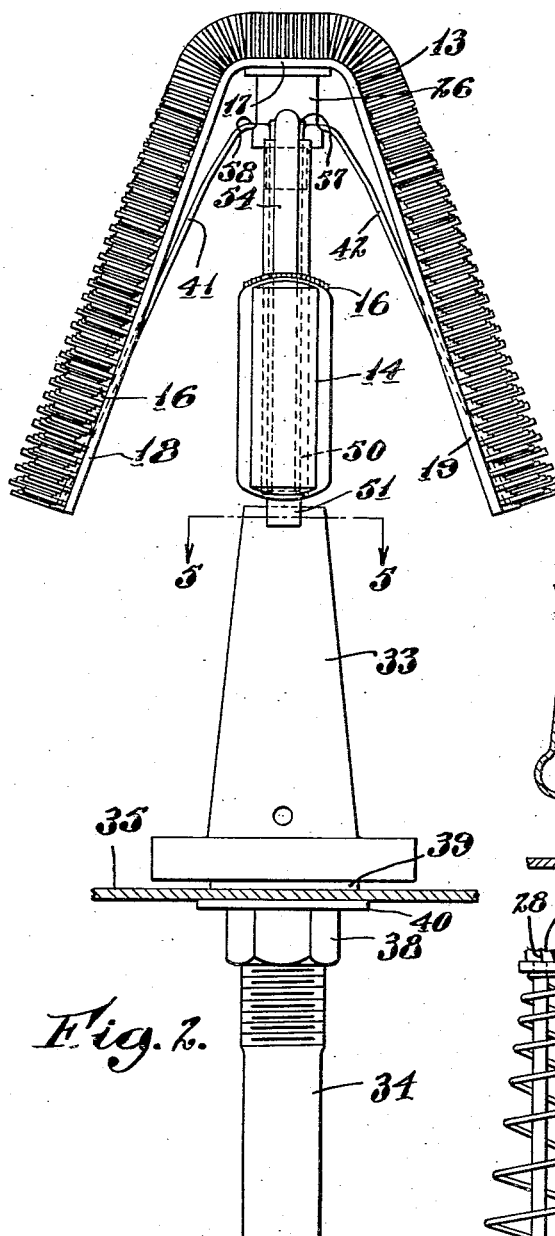
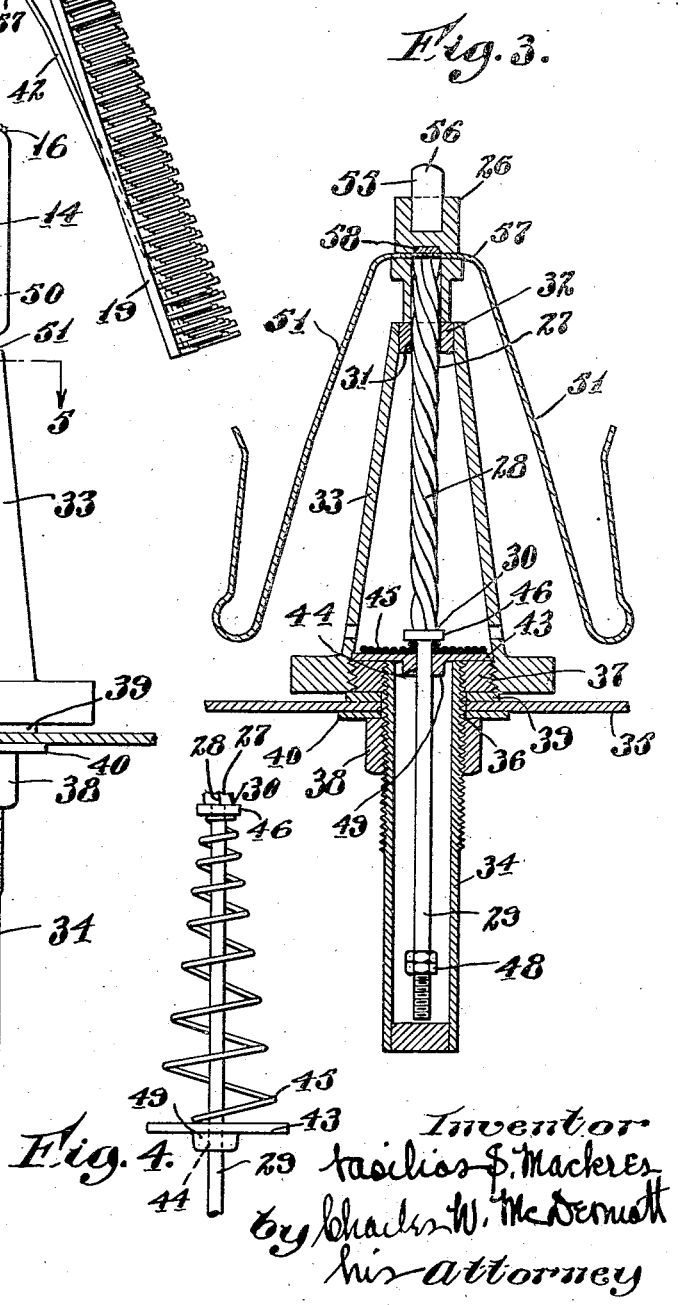

Oct. 13, 1931.  V. S. MACKRES  1,826,942
APPARATUS FOR CLEANING GLASSWARE
Filed Sept. 20, 1927   3 Sheets-Sheet 3
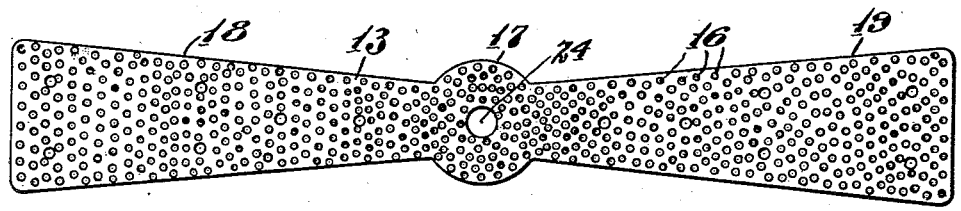
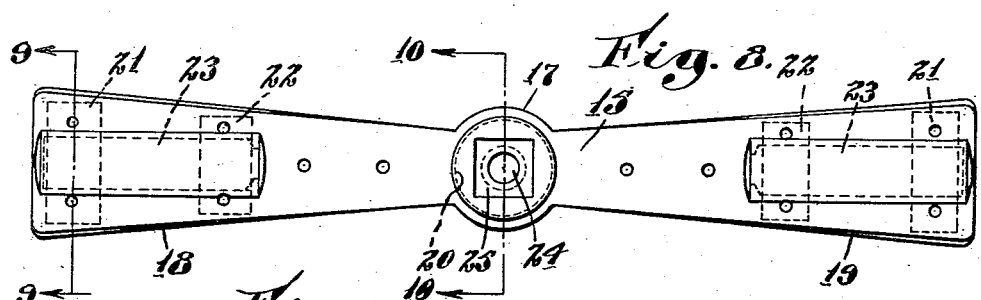
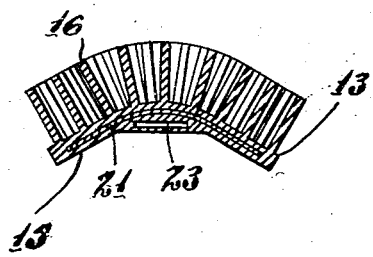
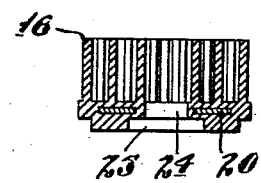
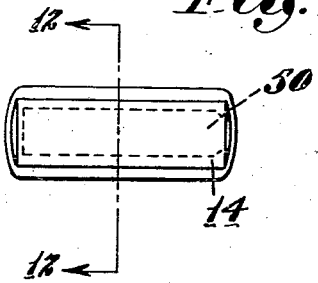
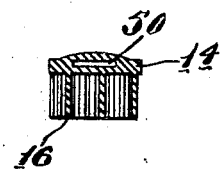
Inventor
Vasilios S. Mackres
by Charles W. McDermott
his Attorney

UNITED STATES PATENT OFFICE

VASILIOS S. MACKRES, OF BROCKTON, MASSACHUSETTS

APPARATUS FOR CLEANING GLASSWARE

Application filed September 20, 1927. Serial No. 220,652.

The present invention relates to an apparatus for cleaning glassware used in dispensing food and beverages.

The dispensing of ice-cream and beverages having a milk base through fountains and stores is attended with great danger to the health of the public owing to the difficulty in cleaning the dispensing glass after use. This difficulty is caused, principally, by the butter fat in the milk products which sticks to the glass in a tenacious manner so that considerable elbow grease is required for its removal. Obviously power driven machines for cleaning glassware is out of place in the general run of fountains and stores employed in dispensing milk products. Attempts have been made, however, to provide dispensers of milk products with a simple and cheap apparatus for cleaning the dispensing glass after use. This apparatus comprised an animal bristle brush carried by a spindle which was mounted so that when a glass was positioned over the brush by the operative and then pushed downwardly the spindle was reciprocated longitudinally through a nut engaged with a spiral surface on the spindle thus imparting rotation to the brush in contact with the glass. But animal bristle brushes are hard to clean and are therefore unsanitary. They shed their bristles easily, and deteriorate readily under the attack of alkalis, acids, and greases in the soaps and cleaning compounds used on the brushes to aid in cleaning the glassware and by the butter fat in the milk products dispensed. Rubber may be compounded to resist the attacks of acids, alkalis, greases and butter fat but heretofore no way has been found to utilize a rubber brush on the rotatable and longitudinally reciprocatable spindle of the apparatus hereinbefore referred to. This is because the tuft of rubber bristles gripped the glass so tightly as to prevent relative movement between the rubber brush and the glass which is necessary in order for the spindle to function properly.

The principal object of the present invention is to produce an apparatus of the rotatable and longitudinally reciprocatable brush supporting spindle type in which rubber brushes may be used to clean glassware.

To the accomplishment of this object a feature of the present invention contemplates the provision in an apparatus for cleaning glassware used in dispensing food and beverages having a tank for a cleaning fluid and a rotatable and longitudinally reciprocatable spindle, of rubber brushes carried by said spindle and submerged in the fluid. With this construction the fluid renders the rubber brushes slippery enough to permit the ready rotation and longitudinal reciprocation of the spindle while the brushes are engaged with the glass without, however, nullifying the rubbing action of the rubber brushes on the glass necessary to clean it of the butter fat.

Fountains for dispensing milk products are necessarily limited in the space occupied by them and, independent of the type of brush employed, it is difficult to find space in the water tanks with which they are usually provided for an apparatus for cleaning glassware for use in dispensing food and beverages provided with a rotatable and longitudinally reciprocatable spindle.

Accordingly another object of the present invention is to produce an apparatus of the type referred to in which the spindle has a short stroke relatively to the bottom of the tank thus to save head room for the operation of the spindle.

To the accomplishment of this object, and such others as may hereinafter appear, the various features of the present invention relate to certain devices, combinations and arrangements of parts fully set forth hereinafter and then described broadly and in detail in the appended claims.

The various features of the present invention will be best understood from an inspection of the accompanying drawings, illustrating the best form of the invention at present known to the inventor, in which:

Figure 1 is a front elevation showing a drinking glass in initial operative position, a tank containing the cleaning fluid being shown broken away and in sectional detail;

Fig. 2 is a right-side elevation showing the normal position of the brushes;

Fig. 3 is a detail in longitudinal sectional elevation, the brushes being removed;

Fig. 4 is a detail elevation of the frusto-conical spring;

Fig. 5 is a sectional plan on the line 5—5, Fig. 2;

Fig. 6 is a perspective of the covering for the resilient arms carrying the brush for cleaning the exterior of the glass;

Fig. 7 is a plan of the brush for cleaning the interior of the glass;

Fig. 8 is an underside plan of the brush illustrated in Fig. 7;

Fig. 9 is a sectional elevation of the line 9—9, Fig. 8;

Fig. 10 is a sectional elevation of the line 10—10, Fig. 8;

Fig. 11 is an underside plan of one of the brushes for cleaning the exterior of the glass; and Fig. 12 is a sectional elevation of the line 12—12, Fig. 11.

Referring to the drawings of the piece of glassware, herein shown as a drinking glass, is cleaned by a brush 13 (Figs. 1 and 2) which engages the bottom and sides interiorly of the glass and by two brushes 14 which engage the exterior of the glass adjacent the mouth thereof. The brush 13 comprises a backing sheet 15 (Figs. 7 and 8) from one face of which projects a tuft of rubber bristles 16 integral with the sheet 15. The brush 13 comprises three portions, namely, a central portion 17 which engages the bottom of the glass, and two lateral wings 18 and 19 which engage a portion of the button and the entire extent of the sides. The central portion 17 is stiffened by an annular copper disk 20 (Fig. 10) which is vulcanized into the material of the sheet 15. The lateral wings 18 and 19 are each stiffened adjacent their ends by two laterally curved pieces of copper 21 and 22 (Figs. 8 and 9) which are vulcanized into the material of the sheet 15. The copper pieces 21 and 22 are curved so as to maintain in an open condition an elongated pocket 23 (Fig. 9) formed within the material of the sheet 15.

The central portion 17 of the brush 13 is provided with an opening 24. The underside of the central portion 17 is provided with a squared depression 25 which fits upon a squared head 26 (Fig. 3) on the upper end of a vertical spindle 27. This spindle is provided with a spiral portion 28 and a cylindrical portion 29 separated by a shoulder 30.

The spiral portion of the spindle 27 engages a spiralled surface 31 (Figs. 3 and 5) formed centrally in a nut 32 carried by the small base of the frusto-conical cage 33 forming part of a casing for the spindle 27. The other part of the casing for the spindle 27 comprises a tube 34 the blind end of which is below the bottom of a tank 35 and the open end of which is positioned through an opening 36 formed in the bottom of the tank 35. The casing for the spindle 27 comprising the cage 33, the blind tube 34 and the coupling 37 are secured to the tank 35 by a nut 38 which is threaded on the tube 34, a rubber washer 39 being interposed between the coupling 37 and the inside bottom of the tank 35, and a metallic washer 40 being interposed between the outside bottom of the tank 35 and the nut 38.

Referring again to the brush 13 the lateral wings 18 and 19 are supported respectively by resilient arms 41 and 42 (Fig. 2). To this end the arm 41 engages within the pocket 23 on the wing 18 and the arm 42 engages within the pocket 23 on the wing 19. With this construction when a glass is positioned over the brush 13 the resilient arms 41 and 42 bend under the pressure of the glass to automatically adapt the brush 13 to the internal shape of the glass. Downward pressure on the glass causes the spindle 27 to be depressed from the position of Fig. 2 into the position of Fig. 3. During the longitudinal reciprocation of the spindle it is rotated by the stationary nut 32 thus causing the brush 13 to rotate within the glass.

During the downward reciprocation of the spindle the cylindrical portion thereof is guided centrally of the tube 34 by a disk 43 which loosely fits within the cage 33 and which loosely engages the coupling 37 and the open end of the tube 34. The disk 43 is provided centrally with an opening 44 which embraces the cylindrical portion of the spindle 27. Downward movement of the spindle 27 is limited by the engagement of the head 26 with the small base of the cage 33.

In order to return the spindle 27 to its normal elevated position and to maintain it there, a frusto-conical spring 45 (Figs 3 and 4) is coiled around the cylindrical portion 29 of the spindle 27 and is interposed between the disk 43 and a small washer 46 loosely mounted on the cylindrical portion 29 in engagement with the shoulder 30. Upward movement of the spindle 27 is limited by nuts 48, on the lower end of the cylindrical portion of the spindle 27, which engage a central boss 49 on the disk 43.

By providing a construction in which the spindle 27 reciprocates in a path partly above and partly below the bottom of the tank, the stroke of the spindle relatively to the bottom of the tank is shortened considerably, thus allowing the spindle to be used in a shallow tank. Moreover, the use of a frusto-conical spring which coils under compression into substantially a single plane (Fig 3) affords a saving in head-room over the cylindrical type of spring heretofore employed with a rotatable and longitudinally reciprocable brush supporting spindle.

Each of the brushes 14 is provided with a pocket 50 (Figs. 11 and 12) by means of which the brush 14 is fitted upon the free end of a resilient arm 51 (Fig. 3). This arm projects from the head 26 downwardly and outwardly and then is bent upwardly, after the arm 51 has cleared the mouth of the glass, to position the brush 14 adjacent the exterior of the glass. In positioning the glass between the brushes 13 and 14 the mouth of the glass engages the arms 51 and bends them inwardly to adapt the brushes 14 to the shape of the glass. In order to protect the mouth of the glass from being chipped or broken by contact with the arms 51, each of the arms 51 is covered by a rubber cover 52 (Fig. 6). This cover comprises a channel 53 which embraces the arm 51 and a thick rib 54 against which the mouth of the glass contacts.

In order to facilitate the relative spinning of the glass and the brush 13 as the glass is pressed downwardly the head 26 carries a vitreous pin 55 of glass or bakelite, for instances. This pin 55 has a rounded tip 56 which engages the bottom of the glass thus providing a hard pivot upon which the glass spins relatively to the brushes.

While the arms 41, 42 and 51 may be separate pieces projecting laterally from the head 26, I prefer to form the arms 41 and 42 in one piece and the arms 51 in another piece. To this end the head 26 is formed in two pieces (see Fig. 3). A strap 57 carrying the arms 51 and a strap 58 carrying the arms 41 and 42 are crossed and welded together and to the adjacent faces of the head 26.

In operation, the tank 35, which is provided with the usual inlet and outlet for the purposes of admitting fresh water into and of draining dirty water out of the tank (not shown), is filled with clean water to which is added soap or a cleaning compound. The glass to be cleaned is then positioned on the rubber brushes which are normally submerged in the cleaning fluid. As shown in Fig. 1 the rubber brushes 13 and 14 automatically adapt themselves to the shape of the glass positioned between them. As also shown in Fig. 1 the mouth of the glass, as it is positioned between the brushes 13 and 14, contacts only with rubber so that chipping or breaking of the mouth of the glass is avoided. When the glass is positioned between the brushes 13 and 14 the pin 55 engages the bottom of the glass. Downward pressure on the glass causes the spindle 27 to reciprocate longitudinally through the nut 32 which through engagement with the spiral 28 rotates the spindle 27 thus causing the glass to spin relatively to the brushes 13 and 14 on the hard pivot 55. The brushes 13 and 14 are rendered slippery enough by the cleaning fluid to rotate readily on the glass without, however, nullifying completely their frictional engagement with the glass sufficient to rub it clean. It must be understood that the positioning of the glass between the brushes 13 and 14 and the reciprocating of the spindle 27 occurs in one continuous downward movement of the glass held in the hands of the operative. At the bottom of its stroke pressure on the spindle 27 is released. The compressed spring 45 then reverses the direction of movement of the spindle to return it to its original normal position. During the return of the spindle to normal position the brushes 13 and 14 rotate on the glass to complete the cleaning thereof.

It will be clear to those skilled in the art and with the general objects of the present invention in view that changes may be made in the details of structure, the described and illustrated embodiment thereof being intended as an exploitation of its underlying essentials, the features whereof are definitely stated in their true scope in the claims hereto appended.

What is claimed as new, is:

1. In an apparatus for cleaning glassware used in dispensing food and beverages, a tank having an opening in the bottom thereof, a casing, extending through said opening, secured to the tank, said casing having a chamber within the tank and a blind tube depending below the tank, a brush supporting spindle having a spiral surface and a cylindrical surface thereon, a stationary nut on the chamber engaged with the spiral portion of the spindle, and a guide engaged with the upper end of the tube and the cylindrical surface of the spindle for maintaining the spindle in the longitudinal axis of the tube.

2. In an apparatus for cleaning glassware used in dispensing food and beverages, a tank having an opening in the bottom thereof, a casing, extending through said opening, secured to the tank, said casing having a frusto-conical cage within the tank and a blind tube depending below the tank, a brush supporting spindle having a spiral surface and a cylindrical surface separated by a shoulder, a washer on the cylindrical surface of the spindle engaged with the shoulder, a guide for maintaining the cylindrical portion of the spindle in the longitudinal axis of the tube, and a frusto-conical spring coiled about the cylindrical portion of the spindle, said spring having its larger base engaged with the guide and its smaller base engaged with the washer.

3. In an apparatus for cleaning glassware used in dispensing food and beverages, a vertical brush supporting spindle having a spiral surface thereon; means for supporting the spindle for rotation and longitudinal reciprocation comprising a frusto-conical cage, and a nut carried by the cage and engaged with the spiral surface on the spindle; and means for maintaining the spindle in a normally elevated position comprising a frusto-conical spring, mounted within the cage, the convolutions of which closely the internal surface of the cage.

4. In an apparatus for cleaning glassware used in dispensing food and beverages, a tank having an opening in the bottom thereof, a blind tube extending through the opening and having its open end positioned within the tank above the bottom thereof, a coupling secured to the tube within the tank, a washer interposed between the coupling and the bottom of the tank, a cage secured to the coupling and provided with a stationary nut, a centrally perforated disk having its periphery engaged with the interior of the cage and supported loosely upon the coupling and the open end of the tube, a vertical brush supporting spindle having a spiral portion embraced by the nut and a cylindrical portion embraced by the opening in the disk, a washer on the cylindrical portion of the spindle, and a spring coiled about the cylindrical portion of the spindle and interposed between the washer and the disk.

5. In an apparatus for cleaning glassware used in dispensing food and beverages, a vertical spindle, a plurality of resilient arms projecting laterally therefrom, a single brush supported by said spindle and two of said arms for cleaning the interior of the piece of glassware including the bottom and sides thereof, and a brush supported by at least one of the other resilient arms for cleaning the exterior of the piece of glassware.

In testimony whereof I have signed my name to this specification.

VASILIOS S. MACKRES.